(12) United States Patent
Yadav et al.

(10) Patent No.: US 10,276,860 B2
(45) Date of Patent: Apr. 30, 2019

(54) MIXED MATERIAL CATHODE FOR SECONDARY ALKALINE BATTERIES

(71) Applicant: Research Foundation of the City University of New York, New York, NY (US)

(72) Inventors: Gautam G. Yadav, New York, NY (US); Joshua Gallaway, New York, NY (US); Michael Nyce, New York, NY (US); Sanjoy Banerjee, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 15/467,240

(22) Filed: Mar. 23, 2017

(65) Prior Publication Data

US 2017/0207447 A1    Jul. 20, 2017

Related U.S. Application Data

(60) Division of application No. 15/394,975, filed on Dec. 30, 2016, which is a continuation of application No. PCT/US2015/055215, filed on Oct. 13, 2015.

(Continued)

(51) Int. Cl.
*H01M 4/30* (2006.01)
*C01G 45/12* (2006.01)
(Continued)

(52) U.S. Cl.
CPC ............... *H01M 4/30* (2013.01); *C01G 45/02* (2013.01); *C01G 45/1228* (2013.01);
(Continued)

(58) Field of Classification Search
CPC .......... H01M 4/06; H01M 4/364; H01M 4/48; H01M 4/50; H01M 4/52; H01M 4/54; H01M 6/04
See application file for complete search history.

(56) References Cited

U.S. PATENT DOCUMENTS 3,939,010 A * 2/1976 Coleman ................ C25D 11/34
429/118
4,451,543 A 5/1984 Dzieciuch et al.
(Continued)

FOREIGN PATENT DOCUMENTS

CN    102513122 A    6/2012
CN    102623188 A *  8/2012
(Continued)

OTHER PUBLICATIONS

Certified U.S. Appl. No. 62/062,983 entitled "Additives for Use with Birnessite-Phase Manganse Dioxide Electrode," filed Oct. 13, 2014, 42 pages.
(Continued)

*Primary Examiner* — Barbara L Gilliam
*Assistant Examiner* — Adam A Arciero
(74) *Attorney, Agent, or Firm* — Conley Rose, P.C.; Andrew M. Metrailer

(57) ABSTRACT

A secondary alkaline battery using manganese dioxide is described. The battery includes a mixed cathode material with birnessite-phase manganese dioxide or electrolytic manganese dioxide (EMD), a bismuth compound and a copper compound selected from the group consisting of elemental copper and a copper salt. In some embodiments, a conductive carbon and/or a binder may also be included.

16 Claims, 11 Drawing Sheets

Related U.S. Application Data

(60) Provisional application No. 62/062,983, filed on Oct. 13, 2014, provisional application No. 62/067,215, filed on Oct. 22, 2014.

(51) Int. Cl.

| | |
|---|---|
| *H01M 4/36* | (2006.01) |
| *H01M 4/62* | (2006.01) |
| *H01M 10/28* | (2006.01) |
| *H01M 4/50* | (2010.01) |
| *C01G 45/02* | (2006.01) |
| *H01M 10/24* | (2006.01) |
| *H01M 2/16* | (2006.01) |
| *H01M 4/24* | (2006.01) |
| *H01M 10/42* | (2006.01) |
| *H01M 4/02* | (2006.01) |

(52) U.S. Cl.
CPC ............ *H01M 2/1653* (2013.01); *H01M 4/24* (2013.01); *H01M 4/364* (2013.01); *H01M 4/50* (2013.01); *H01M 4/623* (2013.01); *H01M 4/625* (2013.01); *H01M 4/626* (2013.01); *H01M 10/24* (2013.01); *H01M 10/28* (2013.01); *H01M 10/4235* (2013.01); *C01P 2006/40* (2013.01); *H01M 2004/028* (2013.01)

(56) References Cited

U.S. PATENT DOCUMENTS

| | | | |
|---|---|---|---|
| 4,520,005 A | 5/1985 | Yao | |
| 4,957,827 A | 9/1990 | Kordesch et al. | |
| 5,011,752 A * | 4/1991 | Kordesch | H01M 4/26 429/206 |
| 5,089,027 A | 2/1992 | Rossoll et al. | |
| 5,156,934 A | 10/1992 | Kainthia et al. | |
| 5,250,374 A | 10/1993 | Zhang | |
| 5,952,124 A | 9/1999 | Kainthla et al. | |
| 7,718,305 B2 | 5/2010 | Daniel-Ivad | |
| 2005/0164089 A1 | 7/2005 | Iltchev et al. | |
| 2006/0147802 A1 * | 7/2006 | Yasuda | C25D 1/04 429/233 |
| 2010/0087885 A1 | 4/2010 | Atanasoska et al. | |
| 2011/0223477 A1 * | 9/2011 | Nelson | H01M 4/06 429/206 |
| 2012/0231323 A1 * | 9/2012 | Takagi | B32B 5/18 429/144 |
| 2013/0187083 A1 | 7/2013 | Iwata et al. | |
| 2015/0214552 A1 | 7/2015 | Cho et al. | |

FOREIGN PATENT DOCUMENTS

| | | |
|---|---|---|
| CN | 102623188 A | 8/2012 |
| EP | 0138316 A1 | 4/1985 |
| JP | 2006225201 A | 8/2006 |
| WO | 9510858 A1 | 4/1995 |
| WO | 2014074830 A1 | 5/2014 |
| WO | 2016061030 A1 | 4/2016 |
| WO | 2017075404 A1 | 5/2017 |

OTHER PUBLICATIONS

Certified U.S. Appl. No. 62/067,215 entitled "Achieving Maximum Discharge Capacity for Higher-Loading MnO2 Cathodes in Rechargeable MnO2—Zn Alkaline Batteries," filed Oct. 22, 2014, 29 pages.
Foreign Communication from the Priority Application—International Search Report and Written Opinion of PCT/US2015/055215, dated Feb. 5, 2016, 11 pages.
Wadsley, A. D., et al., "A Hydrous Manganese Oxide with Exchange Properties," Journal of American Chemical Society, 1950, pp. 1781-1784, vol. 72, No. 4, ACS Publications.
Filing Receipt and Specification of Parent Applicaton U.S. Appl. No. 15/394,975, filed Dec. 30, 2016 (41 pages).
Office Action of U.S. Appl. No. 15/394,975 dated Mar. 22, 2017 (13 pages).
Office Action of U.S. Appl. No. 15/394,975 dated Feb. 15, 2018, 12 pages.
Final Office Action of U.S. Appl. No. 15/394,975 dated Jul. 26, 2017, 18 pages.
International Search Report and Written Opinion of International Application No. PCT/US2016/059394, dated Feb. 3, 2017, 16 pages.
Hashem, Ahmed M., et al., "Synthesis, structure, magnetic, electrical and electrochemical properties of Al, Cu, and Mg doped MNO2," Material Chemistry and Physics, 2011, pp. 33-38, vol. 130, Elsevier B.V.
Foreign Communication from a related Application-Search Report of European Patent Application No. 15851352.3 dated Apr. 16, 2018 (10 pages).
International Preliminary Report on Patentability of International Application No. PCT/US2016/059394, dated May 11, 2018, 13 pages.

* cited by examiner

MIXED MATERIAL CATHODE FOR SECONDARY ALKALINE BATTERIES

CROSS-REFERENCE TO RELATED APPLICATIONS

This application is a divisional of and claims priority to U.S. application Ser. No. 15/394,975 filed Dec. 30, 2016, which is a continuation of and claims priority to International Application No. PCT/US2015/055215 filed Oct. 13, 2015, which claims priority to U.S. Provisional Application No. 62/062,983 filed Oct. 13, 2014 and U.S. Provisional Application No. 62/067,215 filed Oct. 22, 2014, the entirety of which are incorporated herein by reference.

STATEMENT OF FEDERALLY SPONSORED RESEARCH OR DEVELOPMENT

This invention was made with Government support under grant number DEAR0000150 awarded by the U.S. Department of Energy. The government has certain rights in the invention.

BACKGROUND OF THE INVENTION

This disclosure relates to batteries including electrochemical cells. Alkaline manganese dioxide cells have been predominantly used as primary batteries. However, the one-time use of primary batteries results in large material wastage as well as undesirable environmental consequences. Also, potential economic losses can arise due to the significant imbalance between the energy that is required to manufacture these cells compared to the energy that can be actually stored. As a consequence, there is a clear advantage to convert primary cells to rechargeable or secondary cells.

Manganese dioxide has proven recalcitrant to this necessary conversion due to fundamental problems with its crystal structure and side reactions which result in products that are not amenable to charge-discharge cycling. Efforts to develop the zinc-manganese dioxide battery system date back more than forty years, with many unsuccessful attempts made to commercialize it. Secondary (rechargeable) alkaline batteries have recently been marketed using a technology disclosed in U.S. Pat. No. 4,957,827. These rechargeable alkaline batteries require proprietary chargers that improve cycleability (U.S. Pat. No. 7,718,305). However, their lifetime is limited due to fall off in capacity at the high depths of discharge that are of interest in many commercial applications. Due to these limitations, rechargeable alkaline batteries have not yet witnessed widespread adoption.

The theoretical capacity that a manganese dioxide crystal can discharge is 617 mAh/g, which is based on the incorporation of two electrons in the redox reaction. To access this capacity during the discharge process, the manganese dioxide crystal must undergo stressful phase transformations and chemical reaction steps that may lead to its eventual breakdown and loss of rechargeable material. To control these lattice dilations and chemical transformations, the cycled capacity has usually been limited to 5 to 10% of the overall capacity. Wroblowa et al. (EP0138316A1 and U.S. Pat. No. 4,451,543) found that synthesizing the birnessite-phase of manganese dioxide, and incorporating bismuth and lead in the crystal structure through physical or chemical means imparted rechargeability characteristics to the manganese dioxide material. In some cases, they were able to obtain up to 80-90% of the second electron capacity. Yao (U.S. Pat. No. 4,520,005) found a way of incorporating bismuth and lead in the birnessite-phase of the manganese dioxide in a single step reaction. Yao's method was a variation of the original synthesis method by Wadsley (JACS, Vol 72, 1781, 1950). Rechargeable Battery Corporation (U.S. Pat. No. 5,952,124 and U.S. Pat. No. 5,156,934) developed methods for synthesizing oxides or hydroxides of bismuth coated on manganese dioxide and heating nitrates of bismuth and manganese to create a phase of bismuth-manganese dioxide. The prior art shows that bismuth plays a role in lattice stabilization and in avoiding the electrochemical inactive phase of hausmannite ($Mn_3O_4$) during cycling. However, none of the prior art could develop high cycle life with good reliability and reproducibility. Extensive testing indicates that within a few charge-discharge cycles the depth of discharge obtainable falls off rapidly with a large loss of capacity. Also, it was found that the high cycle life obtained in the publications relied on cycling the material potentiodynamically, a cycling protocol that cannot be used in real world applications, rather than galvanostatically which is a preferred protocol to cycle batteries in real world applications. Potentiodynamic cycling is an experimental method in electrochemistry to test the chemical reactions taking place on the electrode, which is not the way that actual batteries operate. Prior arts and literature publications have relied on this type of cycling protocol to show high cycle life, however, on galvanostatic cycling there is rapid loss in capacity that leads to the immediate failure of the battery. Also, the prior art has relied on making electrodes with excessive carbons (about 10 times more than $MnO_2$ loading), to show high cycle life. However, batteries containing electrodes with a 10 times excess of carbon are not economically viable and have very poor energy density that would be impractical in any real world application. Extensive tests have shown that electrodes containing 45 weight percent or more loadings of $MnO_2$ with bismuth incorporation lead to battery failure within 5 cycles.

BRIEF DESCRIPTION OF THE INVENTION

A secondary alkaline battery using manganese dioxide is described. The battery includes a mixed cathode material with birnessite-phase manganese dioxide or electrolytic manganese dioxide (EMD), a bismuth compound and a copper compound selected from the group consisting of elemental copper and a copper salt. In some embodiments, a conductive carbon and/or a binder may also be included. An advantage that may be realized in the practice of some disclosed embodiments of the battery is that a $MnO_2$ alkaline battery is rendered rechargeable.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 9A depicts galvanostatic cycling of 45 wt. % birnessite-type $MnO_2$ mixed with 45 wt. % carbon nanotubes at 1 C while

FIG. 9C depicts galvanostatic cycling of different loadings EMD-type $MnO_2$ mixed with carbon nanotubes at 1 C while

DETAILED DESCRIPTION OF THE INVENTION

Figure 1:
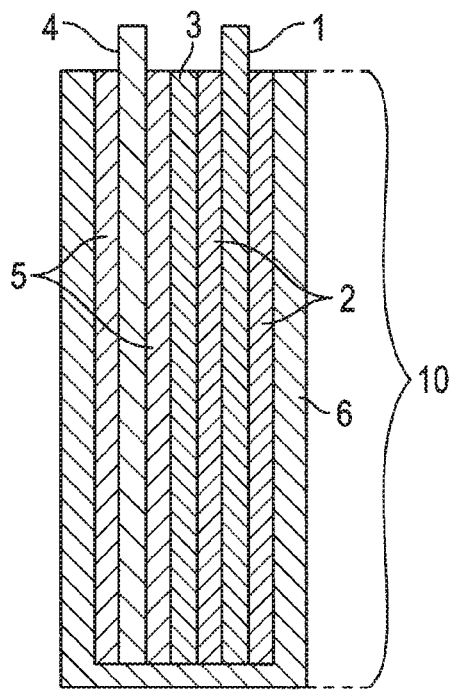
FIG. 1 is a cross section view of an embodiment of the battery in a prismatic arrangement.
Figure 2:
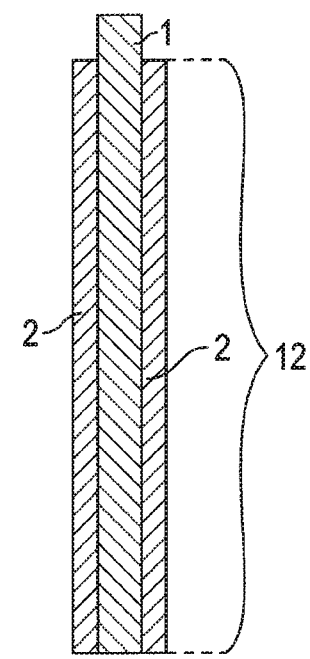
FIG. 2 is a cross section view of an embodiment of the positive electrode or cathode of the battery in a prismatic arrangement.

Referring to FIG. 1 a battery 10 has a housing 6, a cathode current collector 1, a cathode material 2, a separator 3, an anode current collector 4, and an anode material 5. FIG. 1 shows a prismatic battery arrangement. In another embodiment, the battery is a cylindrical battery. An electrolyte is dispersed in an open space throughout battery 10. Referring to FIG. 2 the cathode current collector 1 and cathode material 2 are collectively called either the cathode 12 or the positive electrode 12.

The art described in this disclosure is with regards to the development of rechargeable alkaline cells that employ a mixed material in the cathode 12. The mixed material is a combination of manganese dioxide ($MnO_2$, also referred to as MD), bismuth, and copper. In one embodiment, conductive carbon is also present in the cathode 12. The cathode 12 is incorporated into the battery 10 which may be a secondary battery. The mixed material is based on one or many polymorphs of $MnO_2$, including electrolytic (EMD), $\alpha$-$MnO_2$, $\beta$-$MnO_2$, $\gamma$-$MnO_2$, $\delta$-$MnO_2$, $\varepsilon$-$MnO_2$, or $\lambda$-$MnO_2$. In general the cycled form of manganese dioxide in the cathode is $\delta$-$MnO_2$ which is interchangeably referred to as birnessite. If non-birnessite polymorphic forms of manganese dioxide are used, these are converted to birnessite in-situ by one or more conditioning cycles. For example, a full discharge to the end of the $MnO_2$ second electron stage may be performed and subsequently recharging back to its $Mn^{4+}$ state, resulting in birnessite-phase manganese dioxide.

In one embodiment, the cathode material comprises 2-30% wt conductive carbon, 0-30% conductive metal additive, 1-70% wt. copper compound, 1-20% wt bismuth compound, 0-10% wt binder and birnessite or EMD. In another embodiment the cathode material comprises 2-30% wt conductive carbon, 0-30% conductive metal additive, 1-20% wt bismuth compound, 0-10% wt binder and birnessite or EMD. In one embodiment, the cathode material consists essentially of 2-30% wt conductive carbon, 0-30% conductive metal additive, 1-70% wt. copper compound, 1-20% wt bismuth compound, 0-10% wt binder and the balance birnessite or EMD. In another embodiment the cathode material consists essentially of 2-30% wt conductive carbon, 0-30% conductive metal additive, 1-20% wt bismuth compound, 0-10% wt binder and the balance birnessite or EMD.

| Component | Range (% wt) |
| --- | --- |
| conductive carbon | 2-30% |
| conductive metal additive | 0-30% |
| copper compound | 1-70% |
| bismuth compound | 1-20% |
| binder | 0-10% |
| $MnO_2$ compound | Balance |

The mixed material includes a bismuth compound and copper, which are together allow galvanostatic battery cycling of the cathode. The bismuth compound is incorporated into the cathode 12 as an inorganic or organic salt of bismuth (oxidation states 5, 4, 3, 2, or 1), as a bismuth oxide, or as bismuth metal (i.e. elemental bismuth). The bismuth compound is present in the cathode material at a concentration between 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth.

Figure 3A:
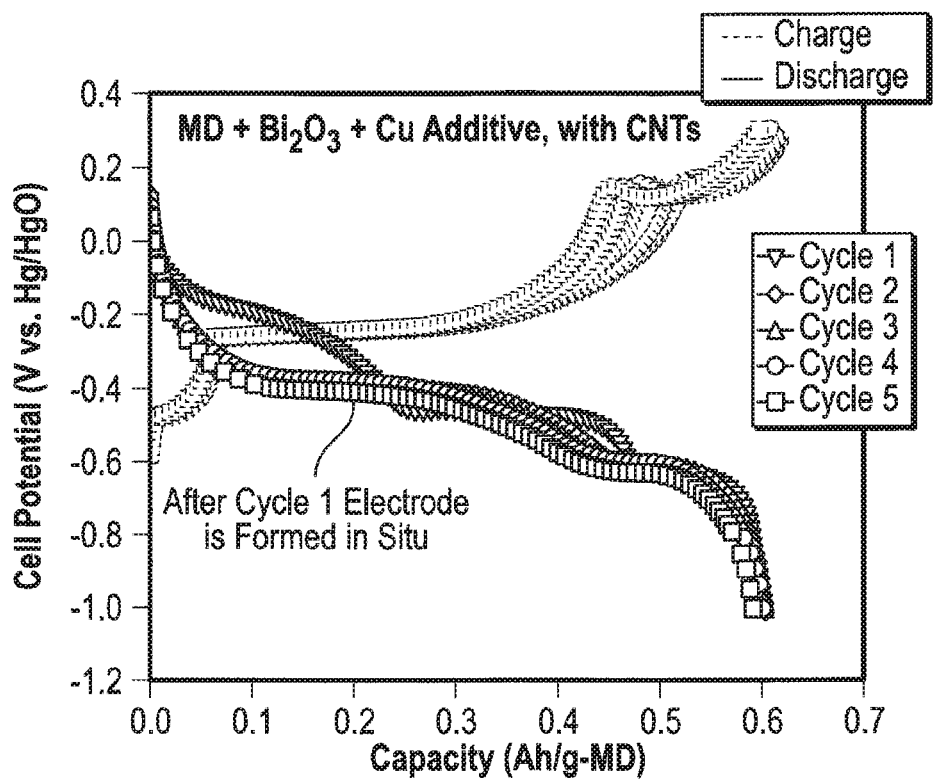
FIG. 3A is a graph illustrating charge and discharge curves of a $MnO_2$+Bi+Cu cathode, charged and discharged galvanostatically at a C/3 rate using a NiOOH counter electrode.
Figure 3B:
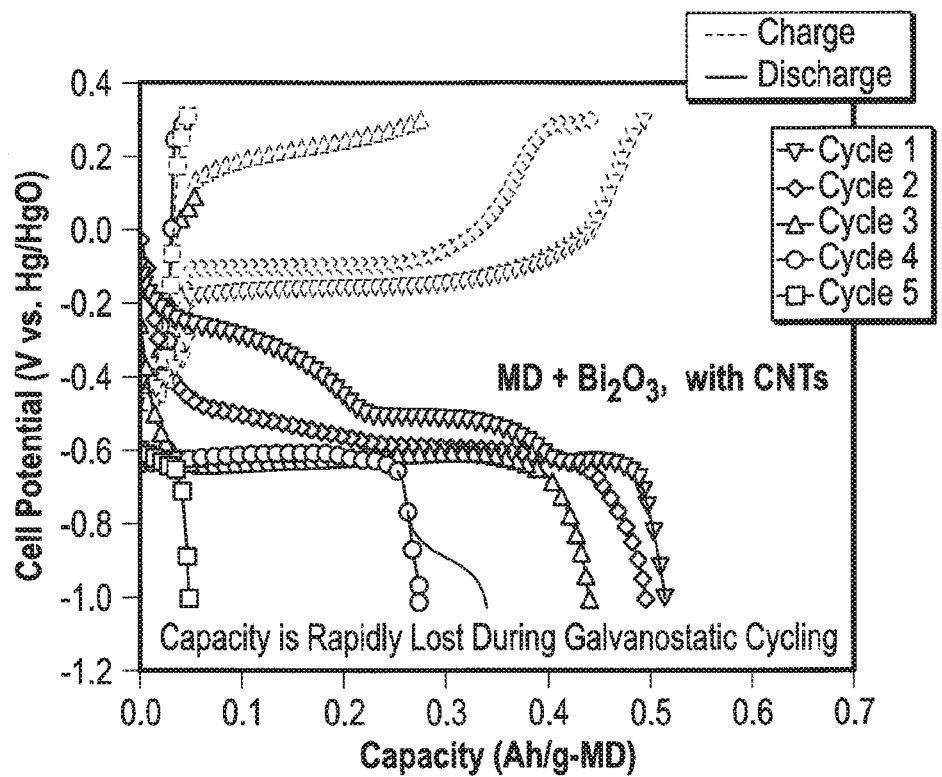
FIG. 3B is a graph illustrating the charge and discharge curves of a similar battery as in (a) but without the Cu component of the mixed material.

The copper compound is incorporated into the cathode 12 as an organic or inorganic salt of copper (oxidation states 1, 2, 3 or 4), as a copper oxide, or as copper metal (i.e. elemental copper). The copper compound is present in a concentration between 1-70 wt %. In one embodiment, the copper compound is present in a concentration between 5-50 wt %. In another embodiment, the copper compound is present in a concentration between 10-50 wt %. In yet another embodiment, the copper compound is present in a concentration between 5-20 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which will not withstand galvanostatic cycling. This is shown in the discussion of FIG. 3A and FIG. 3B.

The addition of the conductive carbon enables high loadings of $MnO_2$ in the mixed material, resulting in high volumetric and gravimetric energy density. The conductive carbon is present in a concentration between 2-30 wt %. Such conductive carbon include single walled carbon nanotubes, multiwalled carbon nanotubes, graphene, carbon blacks of various surface areas, and others that have specifically very high surface area and conductivity. Higher loadings of the $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, and combinations thereof.

The addition of conductive metal additives to the mixed material cathode may be accomplished by addition of nickel powder to the $MnO_2$+Bi+Cu mixture. The conductive metal additive is present in a concentration of 0-30 wt %. The conductive metal additive may be, for example, nickel, copper, silver, gold, tin, cobalt, antimony, brass, bronze, aluminum, calcium, iron or platinum. In one embodiment, the conductive metal additive is a powder. In one embodiment, a second conductive metal additive is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide [$Mn(OH)_2$] which is non-conductive. This ultimately results in a capacity fade in subsequent cycles. Suitable second additives include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal additives may be incorporated into the electrode by chemical means or by physical means (e.g. ball milling, mortar/pestle, spex mixture). An example of such an electrode comprises 5-95% birnessite, 5-95% conductive carbon, 0-50% second conductive metal additive and 1-10% binder.

In some embodiments a binder is used. The binder is present in a concentration of 0-10 wt %. In one embodiment, the binder comprises water-soluble cellulose-based hydrogels, which were used as thickeners and strong binders, and have been cross-linked with good mechanical strength and with conductive polymers. The binder may also be a cellulose film sold as cellophane. The binders were made by physically cross-linking the water-soluble cellulose-based hydrogels with a polymer through repeated cooling and thawing cycles. In one embodiment, 0-10 wt. % carboxymethyl cellulose (CMC) solution was cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders. Using the aqueous-based binder helps in achieving a significant fraction of the two electron capacity with minimal capacity loss over 350 cycles. In one embodiment, the binder is water-based, has superior water retention capabilities, adhesion properties, and helps to maintain the conductivity relative to identical cathode using a TEFLON® binder instead. Examples of hydrogels include methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In one such embodiment, a 0-10 wt % solution of water-cased cellulose hydrogen is cross linked with a 0-10% wt solution of crosslinking polymers by, for example, repeated freeze/thaw cycles, radiation treatment or chemical agents (e.g. epichlorohydrin). The aqueous binder may be mixed with 0-5% TEFLON® to improve manufacturability. The birnessite discharge reaction comprises a dissolution-precipitation reaction where $Mn^{3+}$ ions become soluble and precipitate out on the conductive carbon as $Mn^{2+}$. This second electron process involves the formation of a non-conductive manganese hydroxide $[Mn(OH)_2]$ layer on the conductive graphite.

The cathodes 12 can be produced using methods implementable in large-scale manufacturing. The cathode 12 is capable of delivering the full second electron capacity of 617 mAh/g of the $MnO_2$. Referring to FIG. 3A the cycling performance of a mixed material $MnO_2$+Bi+Cu cathode is shown with complete galvanostatic rechargeability to 617 mAh/g-$MnO_2$. The addition of copper or salts of copper was done through either chemical/electrochemical synthesis or through physical means (e.g. mechanically pressing the bernessite/bismuth, conductive carbon paste about a copper support. Previous literature has focused on a $MnO_2$+Bi mixed material, which does not show good galvanostatic rechargeability and fails by the fifth cycle, as shown in FIG. 3B.

Excellent rechargeable performance can be achieved for both low and high loadings of $MnO_2$ in the mixed material, allowing the cell/battery to achieve very high practical energy densities. FIG. 4A, FIG. 4B, FIG. 4C and FIG. 4D show discharge capacity for two mixed material cathodes, achieving greater than 3700 cycles in both cases. One cathode contained $MnO_2$ at a total mass loading of 5% of the cathode material 2, using the conductive carbon KS44 graphite. The other cathode contained $MnO_2$ at a total mass loading of 45% of the cathode material, with carbon nanotubes (CNTs) as the conductive carbon. The coulombic efficiency of both was nearly 100%. The charge and discharge curves of these cathodes are seen in FIG. 4C and FIG. 4D respectively. The performance of the mixed material can be maintained or enhanced, if needed, by the use of novel aqueous-based binders, additional conductive metal additives, and very conductive carbons.

The resulting cathode may have a porosity in the range of 20%-85% as determined by mercury infiltration porosimetry. In one embodiment, the porosity is measured according to ASTM D4284-12 "Standard Test Method for Determining Pore Volume Distribution of Catalysts and Catalyst Carriers by Mercury Intrusion Porosimetry.

In some embodiments birnessite-phase $MnO_2$ was synthesized in situ by beginning with electrolytic manganese dioxide (EMD) in the mixed material and performing a formation step by fully discharging to the end of the $MnO_2$ second electron stage (617 mAh/g-$MnO_2$ or the $Mn^{2+}$ state) and recharging back to the $Mn^{4+}$ state, resulting in birnessite-phase manganese dioxide ($\delta$-$MnO_2$).

In some embodiments, a method was developed for the synthesis of birnessite-phase manganese dioxide. A 4-10 mole ratio between permanganates to manganese sulfates was used. Solutions of the respective precursors were made and filled in a TEFLON®-lined container that fits inside a hydrothermal reactor. Bismuth could be used at this point or in the post-processing steps where an ion-exchange reaction occurs. Irrespective of the point of bismuth incorporation, a suitable amount of bismuth nitrate, depending on the molar ratio of manganese to bismuth desired in the final product, was added to the solution with around 10 mL of nitric acid. In one embodiment, the hydrothermal reactor is maintained between 130-170° C. for 10-16 hours to obtain the desired birnessite-phase of manganese dioxide doped with bismuth. Similarly, in the ion-exchange procedure, the solutions are preferably stirred for longer periods of time to facilitate better exchange. X-ray diffraction spectrums verify the formation the pure birnessite-phase, and scanning electron images show circular lamellar-like nanostructures.

In some embodiments a second method was used for the synthesis of birnessite-phase $MnO_2$, similar to the method disclosed in Wadsley (JACS, Vol 72, 1781, 1950) or Yao's method mentioned in U.S. Pat. No. 4,520,005. However, this method utilizes inexpensive and safer precursors like manganese chloride instead of nitrates. The source of bismuth could be any bismuth-containing salt including, for example, bismuth chloride. A solution of manganese and bismuth chloride was created depending on the ratio of manganese to bismuth desired in the final product. Around 10 ml of nitric acid was added to the manganese-bismuth solution. A strong solution of alkaline hydroxide (e.g. sodium hydroxide) was created and chilled to 0° C. The chilled sodium hydroxide solution was added to manganese-bismuth solution. The solution was oxidized by either bubbling oxygen or through adding hydrogen peroxide solution (e.g. 0.1-50% w/w). The crystallinity of the final phase of the product depended on the oxidation time. After the reaction was complete, the final product was thoroughly washed with deionized water and weak acid.

The cathode 12 was tested while incorporated in the battery 10 that comprised the housing 6, the cathode 12 supported in the housing 6, various negative electrodes (including the anode current collector 4 and anode material 5) supported in the housing 6, the separator 3 deposited between the cathode 12 and negative electrode, and an alkaline electrolyte (e.g. an alkaline hydroxide, such as NaOH, KOH, LiOH, or mixtures thereof) contained within the housing 6. The electrolyte may have a concentration of between 5% and 50% w/w. The cathode current collector 1 and the anode current collector 4 may be a conductive material, for example, nickel, nickel-coated steel, tin-coated steel, silver coated copper, copper plated nickel, nickel plated copper or similar material. The cathode current collector 1 and/or the anode current collector 4 may be formed into an expanded mesh, perforated mesh, foil or a wrapped assembly. In one embodiment, the cathode current collector is copper-free to prevent or minimize corrosion.

In one embodiment, the cathode material 2 is adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste. A tab of each current collector extends outside of the device and covers less than 0.2% of the electrode area. The separator 3 clearly demarcates the cathode 12 from the negative electrode. The separator 3 may be a polymeric separator (e.g. cellophone, sintered polymer film, or a hydrophilically modified polyolefin). As used in this specification, the phrase "hydrophilically modified polyolefin" refers to a polyolefin whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. The battery 10 was demonstrated to provide high depth of discharge of about 617 mAh/g-MnO$_2$ for many more cycles than achievable with a simpler MnO$_2$+Bi cathode material containing no Cu.

Electrochemical cells were tested with a variety of negative electrodes, including zinc, nickel oxyhydroxide (NiOOH), iron, cadmium and metal hydride (MH). Electrochemical cells with NiOOH negative electrodes were generally used for proof of concept, as it was known that NiOOH has no effect on the mixed material cathode. This was the case in FIG. 3A, FIG. 3B, FIG. 4A, FIG. 4B, FIG. 4C and FIG. 4D. A battery with a zinc negative electrode produces a significant and useful cell voltage enabling its use as a secondary battery. Electrochemical cells of this type were cycled, as in FIG. 5. In these cases additional measures were used to avoid any deleterious effect zincate ions may have on the mixed material cathode, as zinc electrodes release zincate into the alkaline electrolyte. One method used was a wrapped electrode design of the cathode. A second method used was utilizing CELGARD® brand microporous separator, for the separator 3. Both of these methods gave good results and resulted in thousands of cycles. Thus these demonstrated a (mixed material cathode) MnO$_2$—Zn battery. Charge and discharge curves of such a battery are shown in FIG. 5.

In some embodiments, the disclosed battery delivers high energy density (e.g. greater than 50 Wh/L), at a high depth of discharge (e.g. greater than 50% of the second electron capacity, i.e. greater than 318 mAh/g-MnO$_2$) and high C-rates (e.g. greater than 1 C). In one embodiment, the depth of discharge is greater than 90% of the second electron capacity after ten cycles.

In one embodiment, the birnessite is formed using a hydrothermal reaction that comprises mixing a strong oxidizing agent with a manganese salt (e.g. manganese sulfate) in a hydrothermal reactor. Examples of suitable strong oxidizing agents include oxygen, hydrogen peroxide (e.g. 50% w/w), peracetic acid, aromatic peroxides, potassium permanganate, sodium permanganate, ammonium permanganate, calcium permanganate, potassium persulfate, sodium, persulfate and ammonium persulfate. In one such embodiment, the mole ratio of the strong oxidizing agent to the manganese salt is about 1:1. The hydrothermal reaction may also include mixing bismuth nitrate with nitric acid to the oxidized manganese salt. For example, 1-30 mmol of manganese sulfate may be mixed with 1-30 mmol of the strong oxidizing agent along with 0-30 mmol of bismuth nitrate and 0-20 mL of nitric acid. The hydrothermal reaction may be kept at a temperature of between 80° C. and 250° C. for 1-72 hours. The bismuth and/or copper may optionally be incorporated into a layered birnessite composition through a post-processing ion-exchange reaction. For example, 0-30 mmole of bismuth nitrate and/or copper nitrate may be mixed with 0-20 mL of nitric acid to form a layered birnessite.

In another embodiment, the MnO$_2$ is formed by mixing manganese chloride (e.g. 0-5M) with bismuth chloride and/or copper chloride (e.g. 0-30 mmol) and 0-20 mL of nitric acid in chilled 1-10M solutions of alkaline hydroxides (NaOH, KOH, CsOH, LiOH, etc.). In one embodiment, the chilled solutions are between 0-10° C. The solution may be oxidized for between 0.5-24 hours. After formation, the resulting cathode is washed thoroughly with deionized water and a dilute acid (e.g. sulfuric acid).

Example 1

To test the effect of adding copper metal or its derivatives to the mixed material cathode, two electrodes were made, a controlled electrode where there was no copper in the mix and an electrode where there was copper. Both the electrodes contained electrolytic manganese dioxide (EMD) and a bismuth oxide as an additive. The cathode with copper was made by mixing 1.3 g MnO$_2$ (Tronox), 0.26 g Bi$_2$O$_3$, 1.04 g carbon nanotubes (CNTs), and 0.29 g CMC-PVA as a binder. To the resulting paste was added 2.82 g of copper metal. Thus the final composition of the cathode material was (by mass) 22.8% MnO$_2$, 4.6% Bi$_2$O$_3$, 18.2% CNTs, 5.1% binder, and 49.3% copper. The resulting cathode material was pressed on a 6 in$^2$ nickel mesh which was the cathode current collector. The electrode was dried. The electrode with the copper additive will be mentioned as mixed material cathode. The control cathode without copper was made identically, with the same masses of materials, excluding copper.

The mixed material cathode and the control cathode were compressed with NiOOH anodes in a prismatic box. A cellulosic separator was used to separate the cathode and anode. A mercury/mercury oxide reference electrode was used to monitor the potentials of the cathode. The cell was filled with 9M potassium hydroxide. The cathode was cycled between 0.3 V and −1 V versus the reference at C/3.

A comparison of the charge and discharge curves for the first 5 cycles of the cathodes are shown in FIG. 3A. The control cathode performance is shown in FIG. 3B. It initially discharges a capacity of around 500 mAh/g, but it quickly deteriorates to around 50 mAh/g in the fifth cycle. The bismuth additive by itself is not an effective additive to make the electrode galvanostatically rechargeable and this causes catastrophic electrode failure within a span of 5 cycles. The advantageous effect of the copper additive to the mixed material cathode is shown in FIG. 3A. Cyclic voltammogram experiments on versions of the mixed material cathode have demonstrated that the copper is electrochemically active to the extent of about 2 mg of copper per square inch of the electrode. Thus, while present in a large amount, the copper acts as an additive and the vast majority of the cycled cathode capacity (>90%) is due to MnO$_2$. The mixed material cathode is fully rechargeable to the 2$^{nd}$ electron capacity without any deterioration. The stability of the cycling curves also indicates it to be a very steady and reliable cathode. The first discharge cycle demonstrates a typical EMD discharge curve, after which the birnessite-phase MnO$_2$ is formed after the first charge. Second discharge cycle onwards a typical birnessite discharge curve is seen. For the first time in literature, rechargeable galvanostatic cycling of a high-loading MnO$_2$ containing cathode to its full 2$^{nd}$ electron capacity is shown.

Example 2

This example was meant to demonstrate that the mixed material cathodes could be fabricated using various conductive carbons. A graphite-containing mixed material cathode was fabricated by mixing 19.2 mg bismuth-modified MnO$_2$, 161.3 mg KS44 graphite, and 88.2 mg CMC-PVA as a binder. To the resulting paste was added 470 mg of copper metal. Thus the final composition of the cathode material was (by mass) 2.6% Bi-MnO$_2$, 21.8% graphite, 11.9% binder, and 63.6% copper. The molar ratio of Mn chloride to Bi chloride used in the reaction to make the birnessite-phase bismuth-MnO$_2$ was 8:1. CMC-PVA comprised 10 wt. % of the electrode mix. This cathode material was pressed on a 1 sq in. nickel mesh and the electrode was dried. For comparison a CNT-containing mixed material cathode was fabricated by mixing 135.9 mg MnO$_2$, 27.2 mg Bi$_2$O$_3$, 108.7 mg CNTs, and 30.2 mg CMC-PVA as a binder. To the resulting paste was added 470 mg of copper metal. Thus the final composition of the cathode material was (by mass) 17.6% $MnO_2$, 3.5% $Bi_2O_3$, 14.1% CNTs, 3.9% binder, and 60.9% copper. As in the case with graphite this cathode material was pressed on a 1 sq in. nickel mesh and the electrode was dried.

These mixed material cathodes demonstrated that while good results can be observed with either graphite or CNTs, a higher $MnO_2$ mass loading can be achieved with CNTs as the conductive carbon. Thus the graphite-containing cathode will be termed "low-loading" and the CNT-containing cathode will be termed "high-loading." The mixed material cathodes were compressed with NiOOH anodes in a prismatic box. A mercury/mercury oxide reference electrode was used to monitor the potentials of the cathode. The cell was filled with 9M potassium hydroxide. The cathode was cycled between 0.3V and –1V versus the reference at 1 C.

Figure 4A:
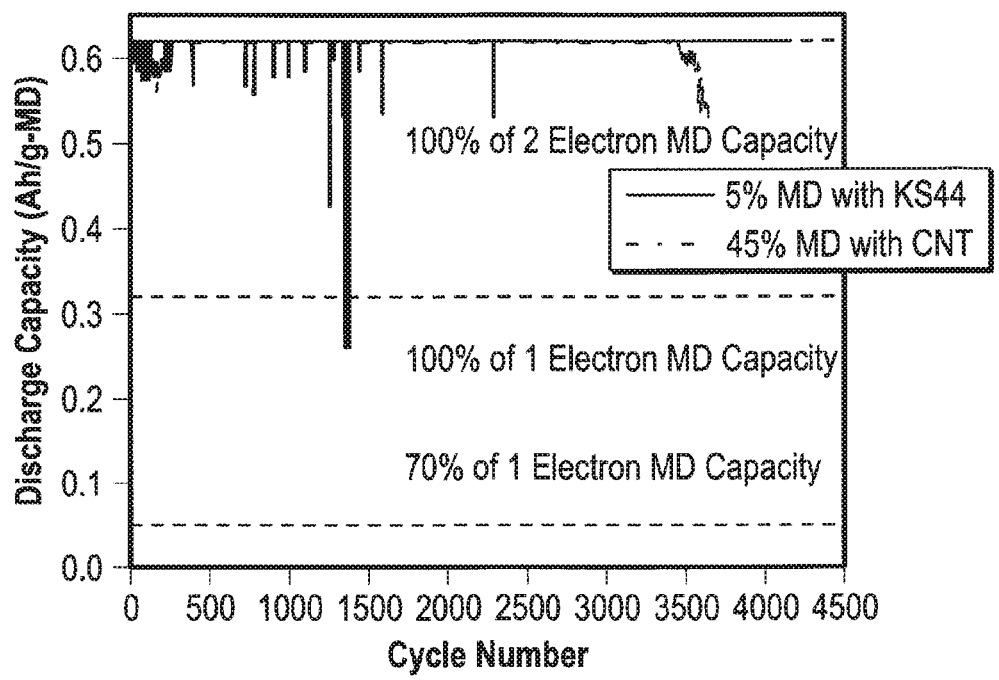
FIG. 4A is a graph illustrating stable discharge capacity curves of a $MnO_2$+Bi+Cu cathodes for over 3700 cycles at manganese dioxide (MD) loadings of both 5% and 45%, charged and discharged galvanostatically at a 1 C rate using a NiOOH counter electrode.
Figure 4B:
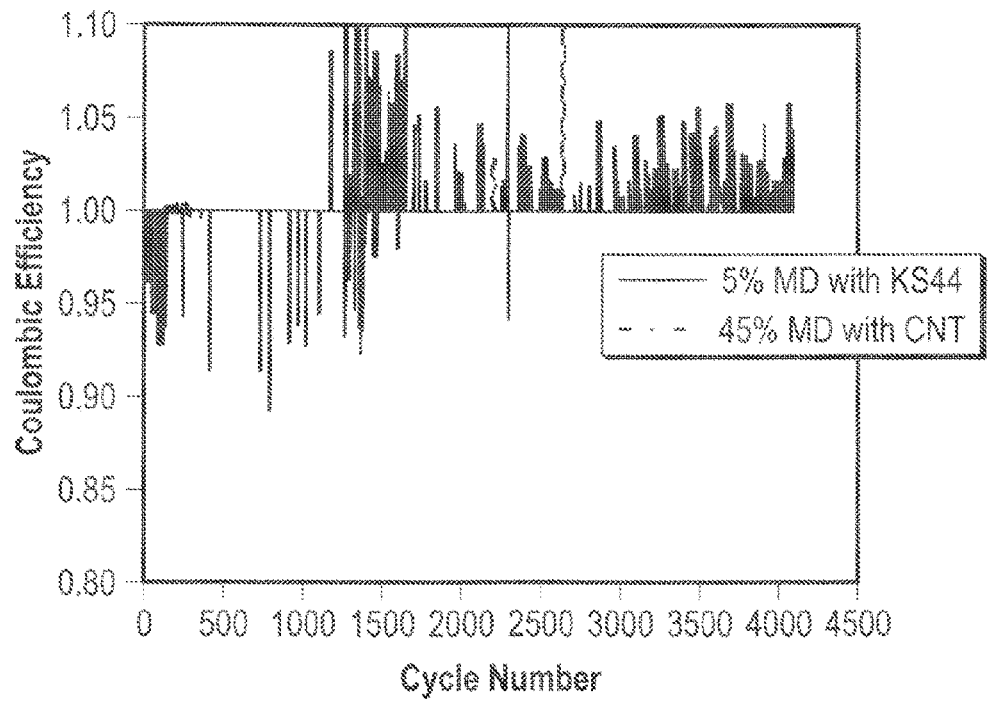
FIG. 4B is a graph illustrating the coulombic efficiency of the batteries in FIG. 4A.
Figure 4C:
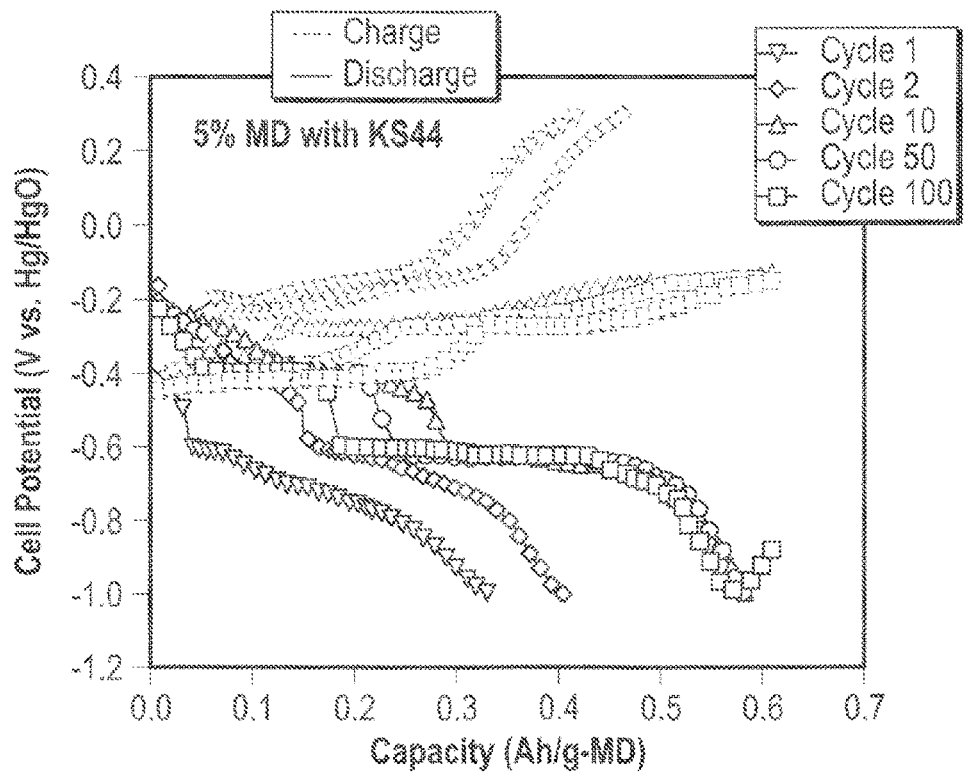
FIG. 4C is a graph illustrating charge and discharge curves of the battery in FIG. 4A with 5% MD and KS44 as a conductive carbon.
Figure 4D:
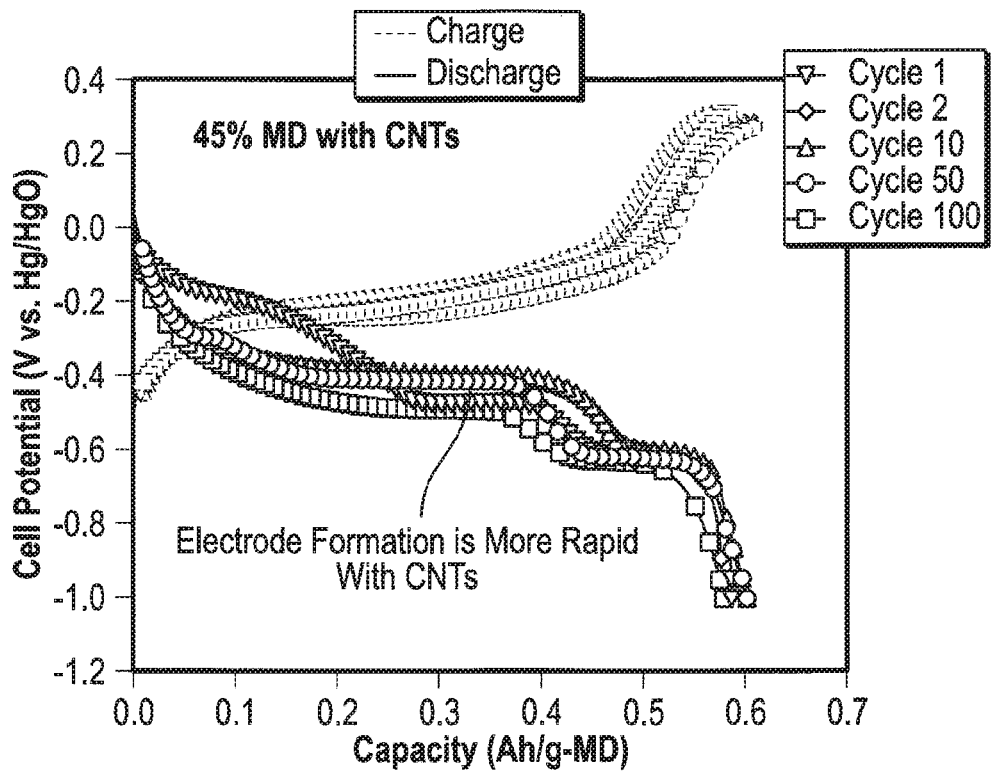
FIG. 4D is a graph illustrating charge and discharge curves of the battery in FIG. 4A with 45% MD and carbon nanotubes (CNTs) as a conductive carbon.
Figure 5:
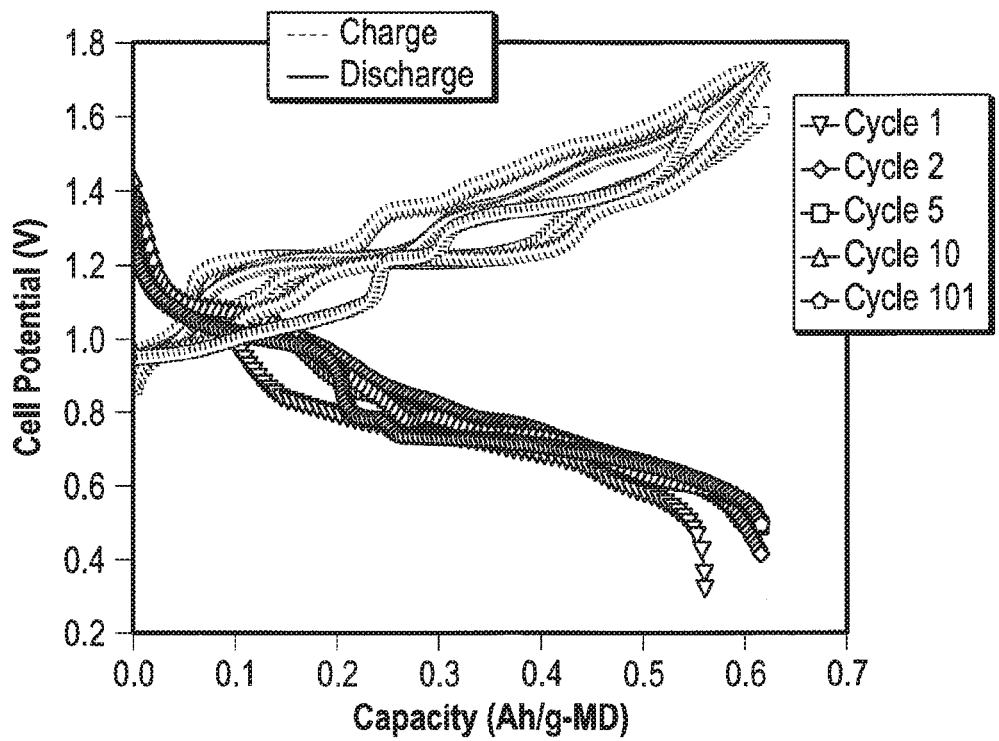
FIG. 5 is a graph illustrating charge and discharge curves of a battery comprising a pasted zinc anode, a microporous membrane separator, a $MnO_2$+Bi+Cu cathode, an alkaline electrolyte, and a battery housing. The battery was charged and discharged galvanostatically at a C/3 rate.

The performance of the mixed material cathodes is shown in FIG. 4A, FIG. 4B, FIG. 4C and FIG. 4D. The long cycle life of these cathodes is shown in FIG. 4A, where there is no loss in capacity even after 4000 cycles for the low-loading and after approximately 3700 cycles for the high-loading cathodes, respectively. The coulombic efficiency is around 100% for these cells as well. FIG. 4C and FIG. 4D show the charge and discharge curves for the low-loading and high-loading electrodes, respectively. The important feature that the curves illustrate are the maintenance of the capacity curves at the same potentials and the full $2^{nd}$ electron capacity. This has never been reported in literature for a $MnO_2$ containing cathode irrespective of mass loading percentages.

Example 3

The performance of the mixed material cathode was tested against a zinc electrode in a battery. The mixed material cathode was made by mixing 0.55 g $MnO_2$ (Tronox), 0.11 g $Bi_2O_3$, and 0.44 g carbon nanotubes (CNTs), with no binder. Instead of binder a few drops of water was used to form the initial paste. To this paste was added 0.47 g of copper metal. Thus the final composition of the cathode material was (by mass) 35% $MnO_2$, 7% $Bi_2O_3$, 28% CNTs, and 30% copper. The resulting cathode material was pressed on a 6 $in^2$ nickel mesh which was then wrapped around the cathode material. The zinc electrode comprised of 13.6 g zinc powder, 1.6 g zinc oxide, and 0.8 g TEFLON®. The zinc anode was pasted and pressed on a copper mesh. Both electrodes were dried.

The mixed material cathode was compressed with zinc anodes in a prismatic box. The cell was filled with 6M potassium hydroxide. The cathode was cycled between 0.4 and 1.75V versus the zinc at C/3.

FIG. 5 shows the charge and discharge capacity curves for the (mixed material cathode) $MnO_2$—Zn battery. The rechargeable characteristic features of this battery are clearly seen at the 101th cycle. This shows a mixed material cathode $MnO_2$—Zn battery can be rechargeable without significant fade to thousands of cycles.

Example 4

To reduce the mass loading of copper, and increase the mass loading of MnO2, an high-loading mixed material cathode was produced. The cathode with was made by mixing 7.84 g $MnO_2$ (Tronox), 0.9 g $Bi_2O_3$, and 2.82 g carbon nanotubes (CNTs). To the resulting paste was added 2.82 g of copper metal. Thus the final composition of the cathode material was (by mass) 55.9% $MnO_2$, 6.4% $Bi_2O_3$, 17.6% CNTs, and 20.1% copper. The resulting cathode material was pressed on a 6 $in^2$ nickel mesh which was the cathode current collector. The electrode was dried.

This mixed material cathode was compressed with NiOOH anodes in a prismatic box. A cellulosic separator was used to separate the cathode and anode. A mercury/mercury oxide reference electrode was used to monitor the potentials of the cathode. The cell was filled with 9 M potassium hydroxide. The cathode was cycled between 0.3 V and –1 V versus the reference at C/3.

Example 5

To test the effect of the binders, two different mixes, one containing CMC-PVA as the binder and the other TEFLON®, were made. As this example was meant to demonstrate the effectiveness of the CMC-PVA binder, no copper was used in this electrode. The electrodes were made by mixing 64.5 mg birnessite-phase bismuth-$MnO_2$, 1.097 g KS-44 graphite, and 130 mg of the respective binder. The mix was pasted on nickel mesh and pressed. The electrode was dried.

The birnessite-phase bismuth-$MnO_2$ electrodes were compressed with NiOOH anodes in a prismatic box. A mercury/mercury oxide reference electrode was used to monitor the potentials of the birnessite electrode. The cell was filled with 9 M potassium hydroxide. The birnessite electrode was cycled between 0.3 V and –1 V versus the reference at 1 mV/sec.

Figure 6A:
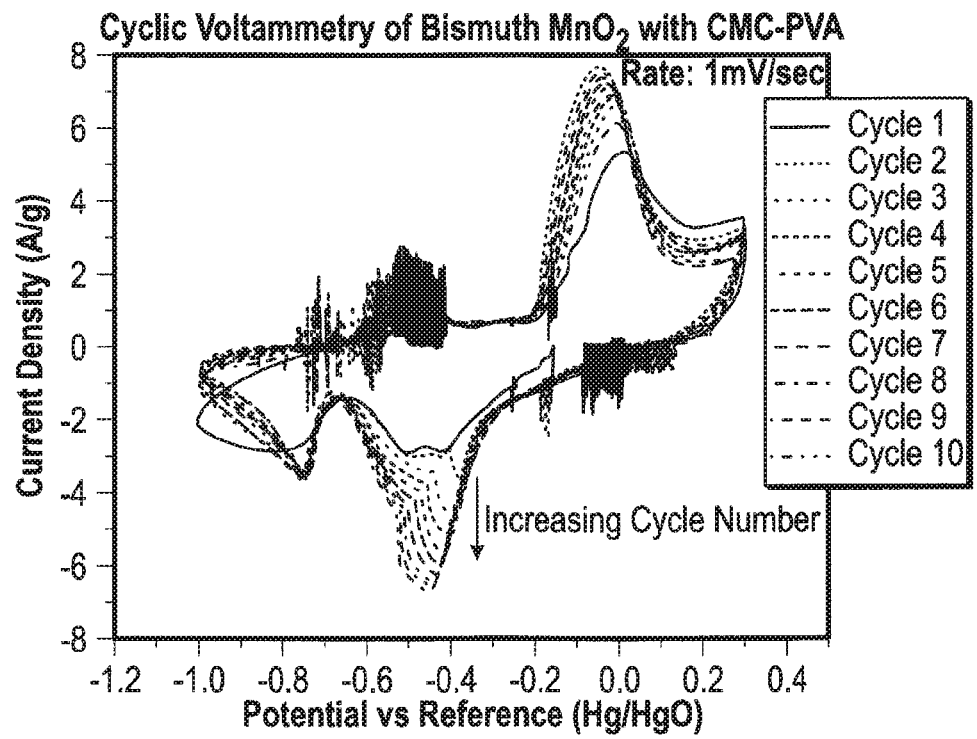
FIG. 6A shows cyclic voltammetry scan of the first ten cycles of birnessite-phase bismuth-$MnO_2$ mixed with CMC-PVA binder at 1 mV/sec between 0.3 V and −1 V.
Figure 6B:
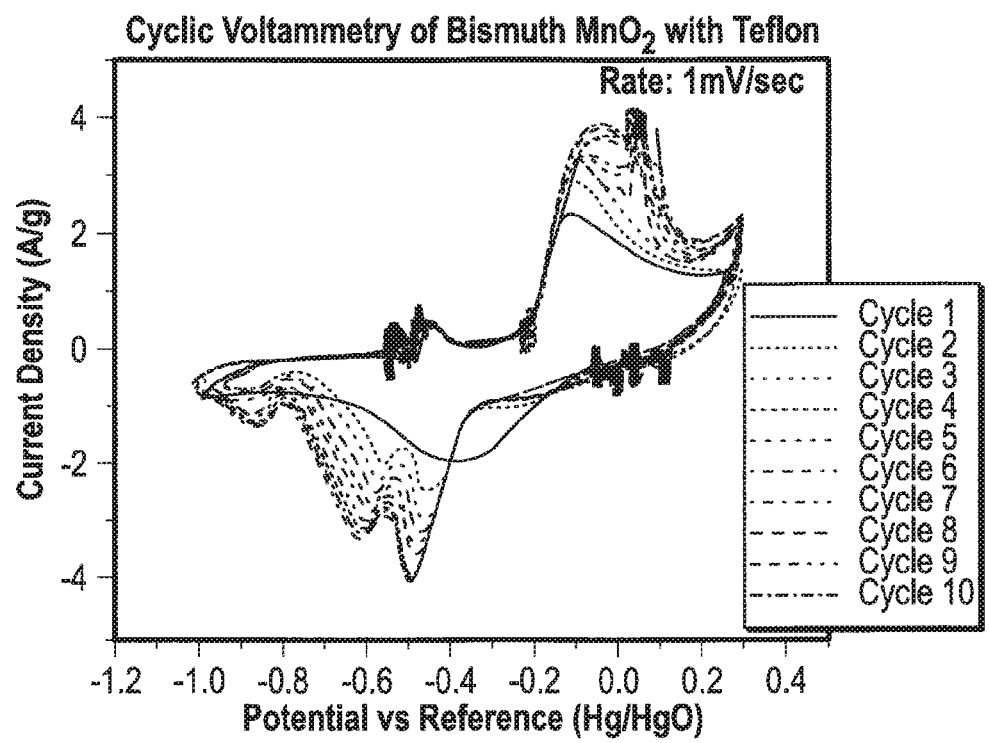
FIG. 6B depicts cyclic voltammetry scan of the first ten cycles of Birnessite-phase bismuth-$MnO_2$ mixed with TEFLON® brand polytetrafluoroethylene binder at 1 mV/sec between 0.3 V and −1 V.
Figure 6C:
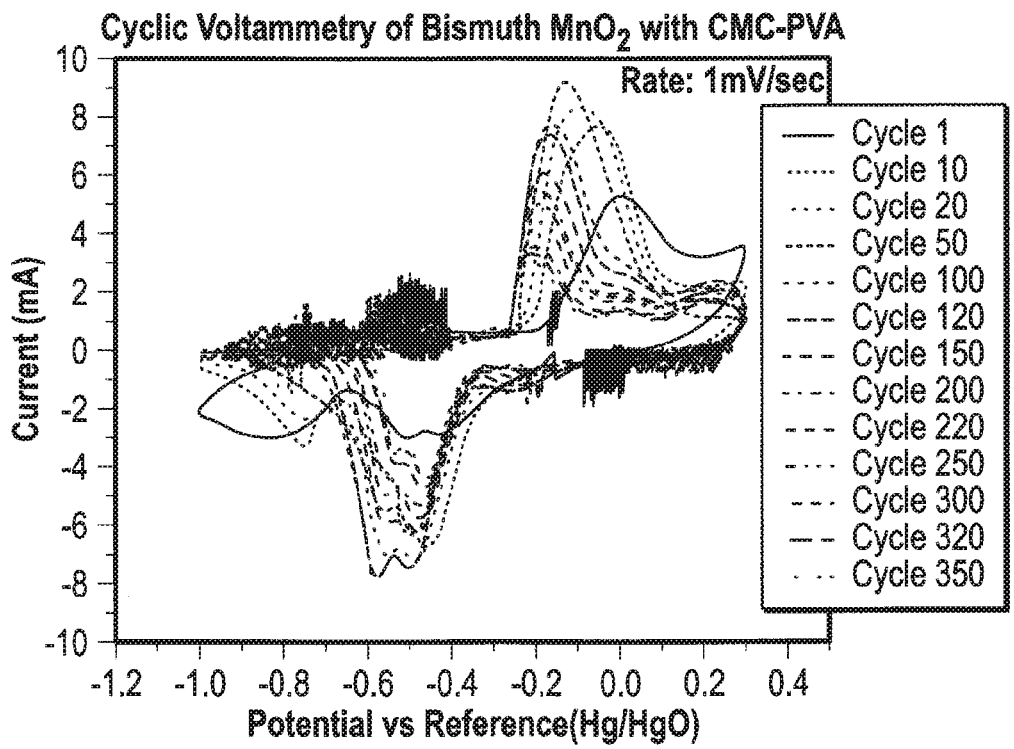
FIG. 6C shows cyclic voltammetry scan of various cycles of birnessite-phase bismuth-$MnO_2$ mixed with CMC-PVA at 1 mV/sec between 0.3 V and −1 V showing less overpotentials and impedance with increasing cycle numbers.
Figure 6D:
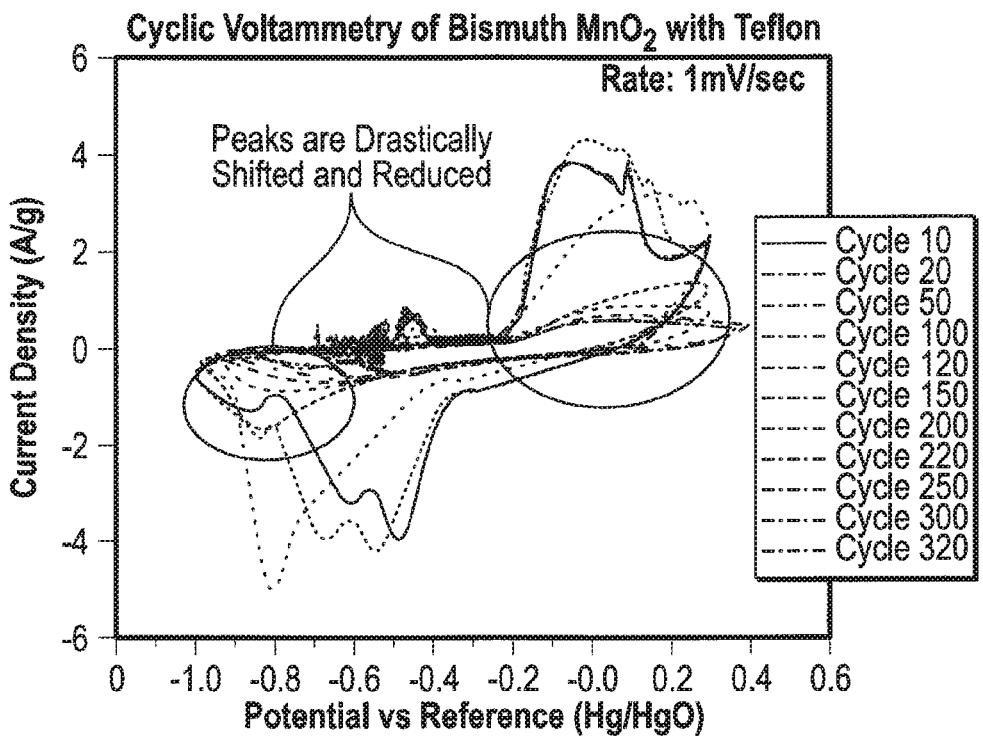
FIG. 6D depicts cyclic voltammetry scan of various cycles of birnessite-phase bismuth-$MnO_2$ mixed with TEFLON® at 1 mV/sec between 0.3 V and −1 V showing increasing overpotentials and impedance with increasing cycle numbers. The numbers on the diagram represent cycle numbers, and the potential was increased to 0.4 V after 120 cycles.

FIG. 6A and FIG. 6B show potentiodynamic scans for the first ten cycles for the electrode made with CMC-PVA and TEFLON®, respectively. The respective scans show an increase in peak height and width with increase in cycle number. The main difference in the performance of the binders can be seen in the current density of the peaks. The electrode containing CMC-PVA clearly shows much higher current densities compared to the electrode containing TEFLON®. Four peaks can be seen in the bottom half of the scan (negative current densities). The first peak near –0.2 V represents the small conversion of $Mn^{4+}$ ions to $Mn^{3+}$ ions. The two peaks between –0.4 V and –0.7 V for both scans represent the first and second electron reactions where bulk of the $Mn^{4+}$ gets converted to $Mn^{2+}$. The last peak represents the reduction of bismuth oxide. The position of the peaks with increasing cycle number seem stable for the CMC-PVA electrode, while the electrode containing TEFLON® seems to shift to more negative potentials. The end of the second electron reaction for the electrode containing TEFLON® is at a much lower negative potential than that of CMC-PVA. The stability of the position of the peaks is important during discharge as it indicates the constant deliverance of energy at the same potential with increasing cycles. In the top-half section of the scan, three peaks are observed initially for both the electrodes. The first two peaks are near –0.6 V and –0.5 V, which indicate the oxidation of bismuth. The major peak is near –0.1 V, which indicates the oxidation from $Mn^{2+}$ to $Mn^{4+}$. However, in FIG. 6B, for the electrode containing TEFLON®, an onset of a fourth peak appears on the fourth cycle. This probably indicates that the $Mn^{2+}$ to $Mn^{4+}$ is a two-step oxidation process. FIG. 6C and FIG. 6D show the long-term cycling effects on the electrodes containing CMC-PVA and TEFLON®, respectively. The plots clearly show the advantages of using CMC-PVA over TEFLON®. After 350 cycles, the major $1^{st}$ and $2^{nd}$ electron reaction peaks are visible for the electrode containing CMC- PVA, and more importantly, in the same range between −0.4 V and −0.6 V, respectively. There is a slight shift in peak position due to a small increase in overpotential. The detrimental effects of TEFLON® can be seen in the first 50 cycles, where the peaks shift drastically to lower potentials in the discharge process. After 320 cycles, the reactions taking place on the electrode containing TEFLON® have almost completely diminished, delivering very little capacity. It is important to note that the negative effects of TEFLON® are so overwhelming that it is sufficient to negate the conductivity of an electrode containing 10 times graphite.

Figure 7A:
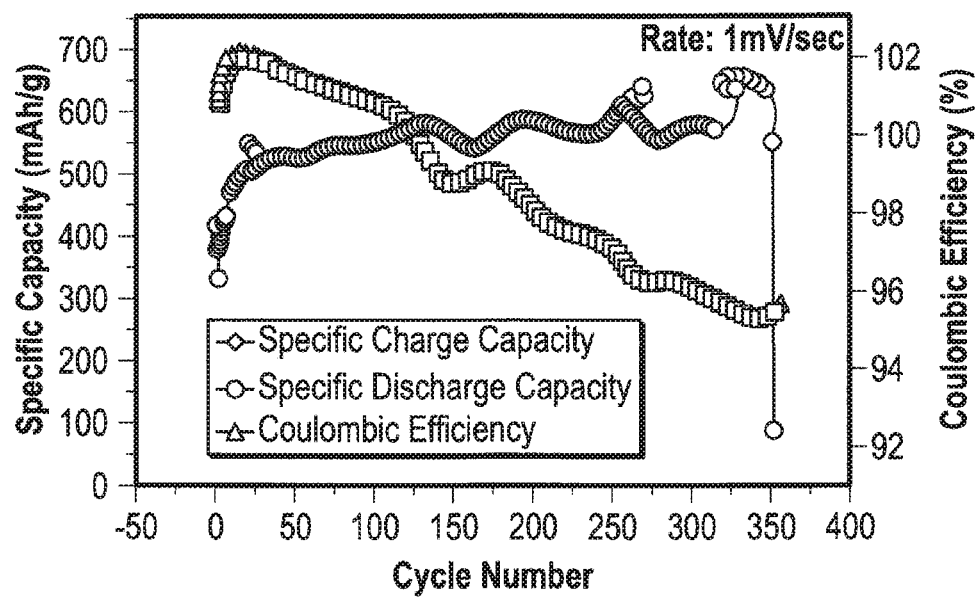
FIG. 7A depicts a plot of Specific charge and discharge capacity and coulombic efficiency versus cycle number for birnessite-phase bismuth-$MnO_2$ mixed with CMC-PVA at 1 mV/sec between 0.3 V and −1 V.
Figure 7B:
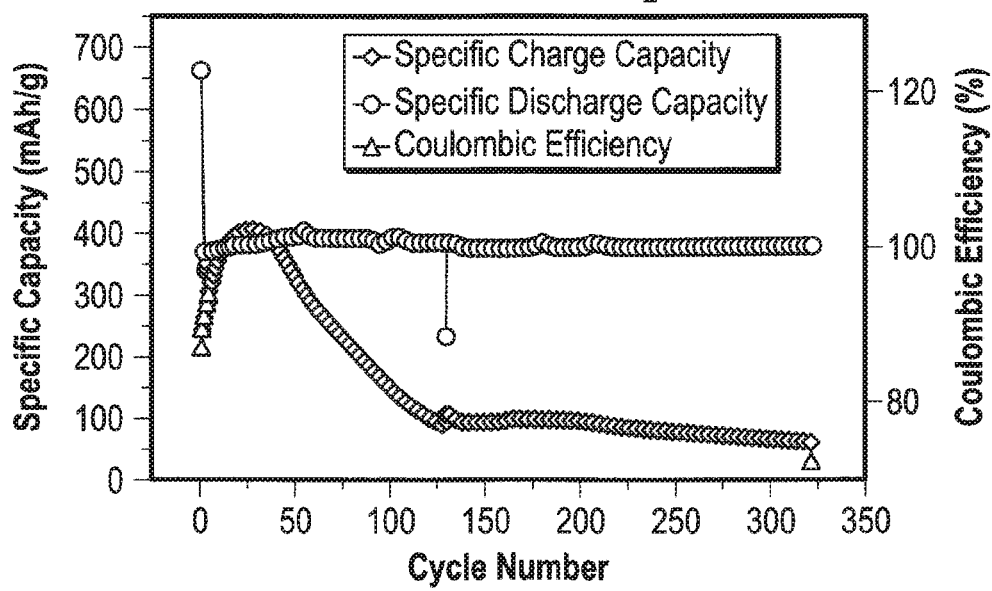
FIG. 7B shows a plot of specific charge and discharge capacity and coulombic efficiency versus cycle number for birnessite-phase bismuth-$MnO_2$ mixed with TEFLON® at 1 mV/sec between 0.3 V and −1 V. (Charge potential increased to 0.4 V after 120 cycles)

FIG. 7A and FIG. 7B show the specific capacity fade for the electrodes containing CMC-PVA and TEFLON®, respectively. For both the electrodes an increase in capacity is observed for the first 50 cycles. However, for the electrode containing TEFLON®, the capacity that can be drawn from the electrode is much lower than that compared to the one containing CMC-PVA. After 350 cycles, the electrode containing CMC-PVA has a capacity of around 300 mAh/g, while the electrode containing TEFLON® has reduced drastically to around 50 mAh/g. FIG. 7B shows a good comparison of the capacity fade between the two electrodes, and one of the advantages of using CMC-PVA as a binder over TEFLON®.

Example 6

The purpose of this example was to show the effectiveness of added conductive metal in the electrode, which served as a replacement for some part of the conductive carbon. The electrodes were made by mixing 52 mg birnessite-phase bismuth-$MnO_2$, 312 mg KS-44 graphite, and 208 mg nickel powder till the mixture was homogeneous. The balance of the mix was 470 mg CMC-PVA used as a binder. The mix was pasted on nickel mesh and pressed. The electrode was dried.

The birnessite-phase bismuth-$MnO_2$ electrodes were compressed with NiOOH anodes in a prismatic box. A mercury/mercury oxide reference electrode was used to monitor the potentials of the birnessite electrode. The cell was filled with 9 M potassium hydroxide. The birnessite electrode was cycled between 0.3 V and −1 V versus the reference at 1 mV/sec.

Figure 8A:
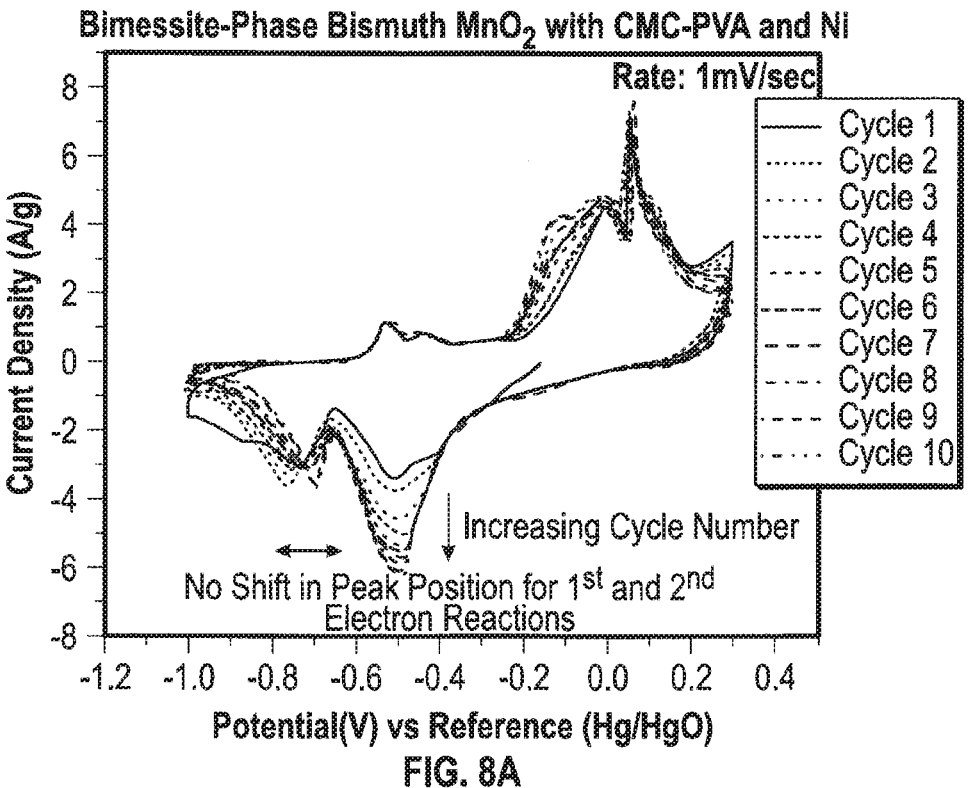
FIG. 8A shows a cyclic voltammetry scan of the first ten cycles of birnessite-phase bismuth-$MnO_2$ mixed with CMC-PVA binder and Ni additive at 1 mV/sec between 0.3 V and −1 V.
Figure 8B:
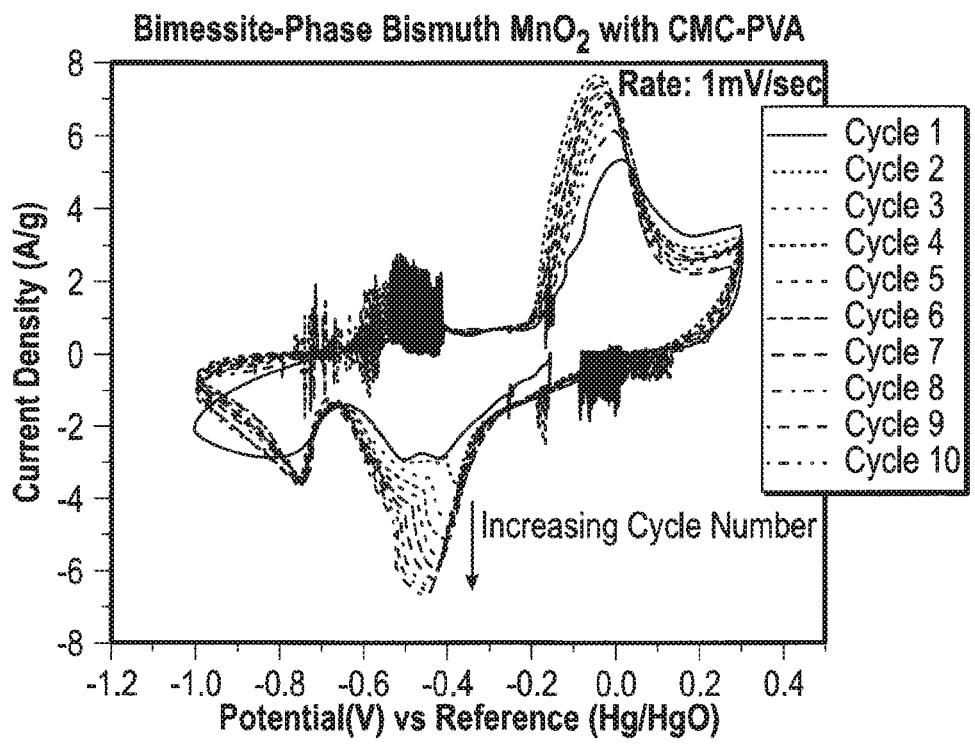
FIG. 8B depicts a cyclic voltammetry scan of the first ten cycles of birnessite-phase bismuth-$MnO_2$ mixed with CMC-PVA binder at 1 mV/sec between 0.3 V and −1 V.
Figure 8C:
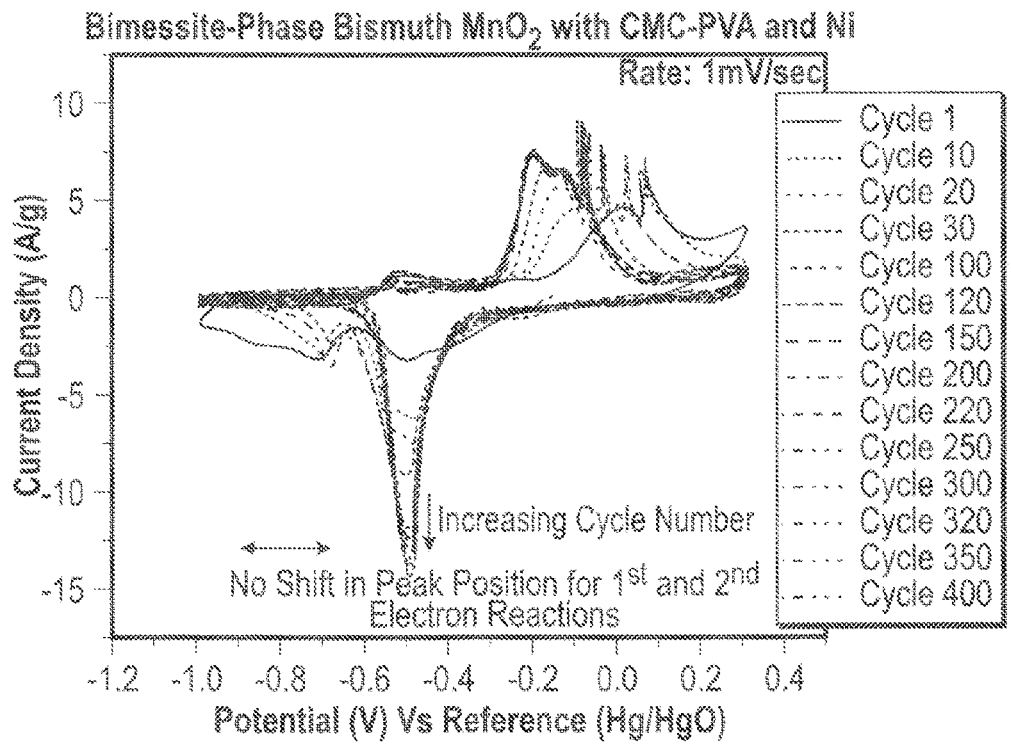
FIG. 8C shows a cyclic voltammetry scan of various cycles of birnessite-phase bismuth-$MnO_2$ mixed with CMC-PVA and Ni at 1 mV/sec between 0.3 V and −1 V showing no overpotentials for the major $1^{st}$ and $2^{nd}$ electron reactions with increasing cycle numbers.
Figure 8D:
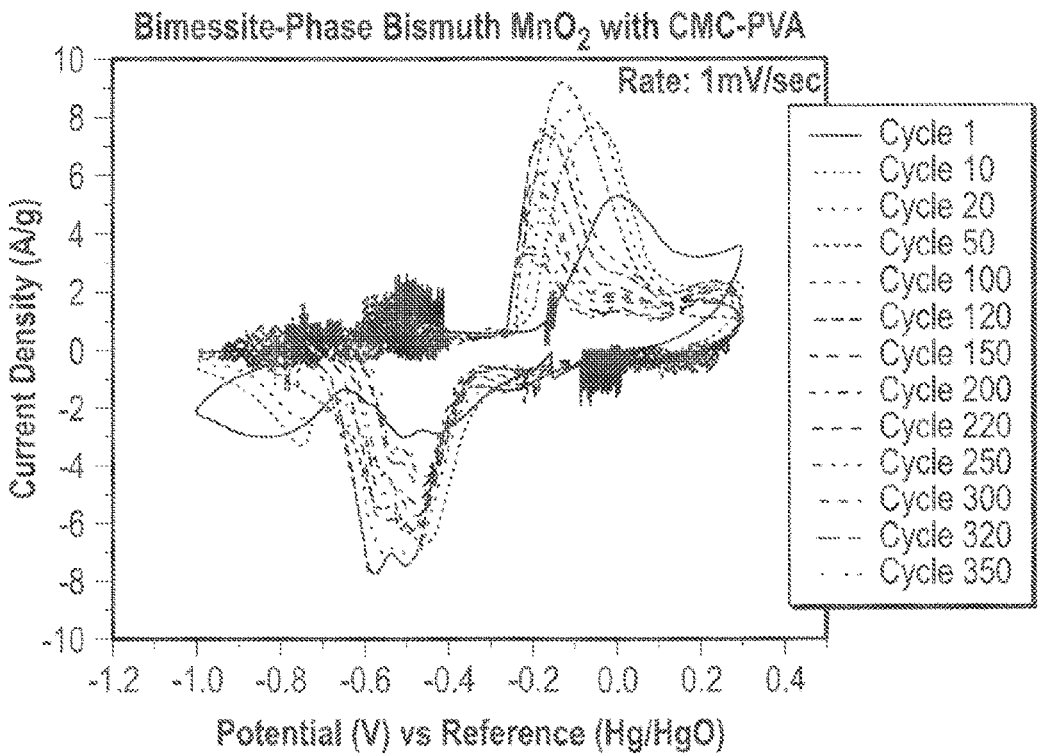
FIG. 8D depicts a cyclic voltammetry scan of various cycles of birnessite-phase bismuth-$MnO_2$ mixed with only CMC-PVA at 1 mV/sec between 0.3 V and −1 V showing slight increase in overpotentials and impedance with increasing cycle numbers.

FIG. 8A and FIG. 8B show the potentiodynamic scans for the first ten cycles for the electrode containing CMC-PVA with Ni and only CMC-PVA, respectively. The respective scans show an increase in peak height and width with increase in cycle number. Four peaks can be seen in the bottom half of the scan (negative current densities). The first peak near −0.2 V represents the small conversion of $Mn^{4+}$ ions to $Mn^{3+}$ ions. The two peaks between −0.4 V and −0.7 V for both scans represent the first and second electron reactions where bulk of the $Mn^{4+}$ gets converted to $Mn^{2+}$. The last peak represents the reduction of bismuth oxide. The position of the peaks with increasing cycle number seem stable for the CMC-PVA with Ni electrode, while the electron containing only CMC-PVA seems to shift slightly to more negative potentials. In the top-half section of the scan, three peaks are observed for the electrode containing only CMC-PVA, while for the electrode containing CMC-PVA with Ni, initially, four peaks are observed. The first two peaks are near −0.6 and −0.5 V, which indicate the oxidation of bismuth. For the electrode containing only CMC-PVA, the major peak is near −0.1 V, which indicates the oxidation from $Mn^{2+}$ to $Mn^{4+}$. However, in FIG. 8A, for the electrode containing CMC-PVA with Ni, the manganese oxidation step appears to be a two-step process, but the formation of a shoulder peak on the main peak near −0.1 V indicates a much more complicated oxidation process which is depended on conductivity. FIG. 8C and FIG. 8D show the long-term cycling effects on the electrodes containing CMC-PVA with Ni and only CMC-PVA, respectively. The plots clearly show the advantage of using a second conductive metal additive. After 350 cycles, the major $1^{st}$ and $2^{nd}$ electron reaction peaks remain at the same potentials for the electrode containing CMC-PVA with Ni, while the electrode containing only CMC-PVA experiences a shift due to an increase in overpotential. It is also important to note the reduction in the current density peak height for the electrode containing only CMC-PVA (FIG. 8D). The reduction in peak height corresponds to a loss in capacity, which is quite rapid for the electrode containing only CMC-PVA.

Example 7

A first electrode was constructed by mixing 0.7 g of birnessite-type $MnO_2$ with 0.7 g carbon nanotubes until the mixture was homogeneous. The balance of the mix was 0.16 g CMC-PVA. The electrode mix was pasted on a copper mesh, pressed and dried. This electrode was cycled galvanostatically at a 1 C rate.

A second electrode was constructed by mixing 0.7 g EMD-type $MnO_2$ (Tronox) with 0.56 g carbon nanotubes and 0.14 g $Bi_2O_3$ until the mixture was homogeneous. The balance of the mix was 0.16 g CMC-PVA. The electrode mix was pasted on a copper mesh, pressed and dried. This electrode was cycled galvanostatically at a 1 C rate.

A third electrode was constructed by mixing 0.7 g of birnessite-type $MnO_2$ with 0.62 g graphite (KS44) and 0.08 g carbon nanotubes. The balance was 0.16 g CMC-PVA. The mix was pasted on a copper mesh and pressed. The electrode was dried. This electrode was cycled galvanostatically at a C/3 rate.

A fourth electrode was constructed by mixing 0.94 g of EMD-type $MnO_2$ with 0.19 g $Bi_2O_3$ and 0.07 g carbon nanotubes. The balance was 0.36 g CMC-PVA binder. The electrode mixes were pasted on a copper mesh, pressed and dried. The electrode was cycled galvanostatically at a 1 C rate.

A fifth electrode was constructed by mixing 1.16 g of EMD-type $MnO_2$, 0.16 g $Bi_2O_3$, and 0.16 g carbon nanotubes. The balance was 0.08 g of CMC-PVA binder. The electrode mix was pasted on a copper mesh, pressed and dried. This 75 wt. % electrode was cycled at both C/3 and C/5 rates.

The electrodes were compressed with the nickel anodes in a prismatic box. A mercury/mercury oxide reference electrode was used to monitor the potentials. A cell was filled with 9M potassium hydroxide. The birnessite electrode was cycled galvanostatically between 0.3V and −1V versus the reference.

Figure 9A:
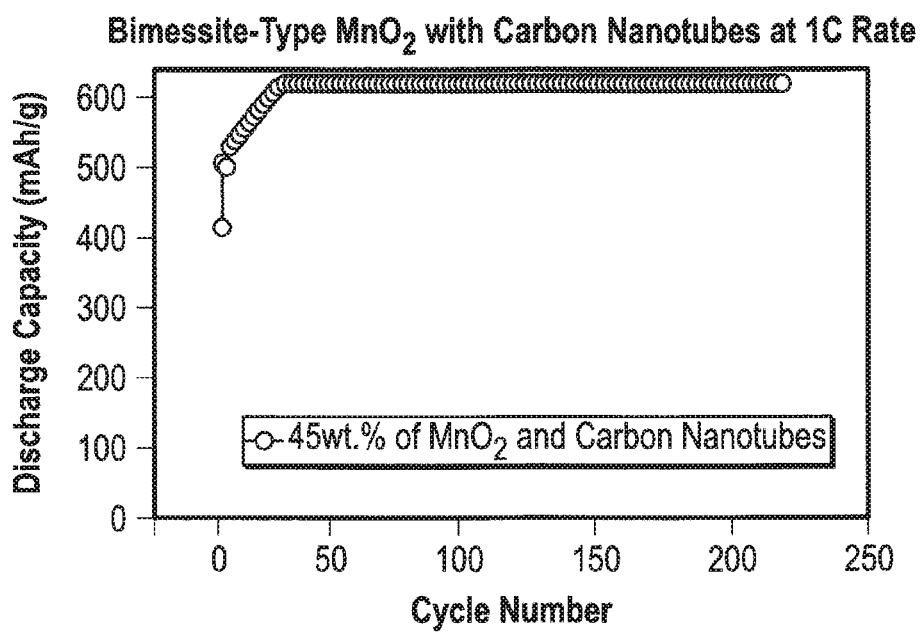
Figure 9B:
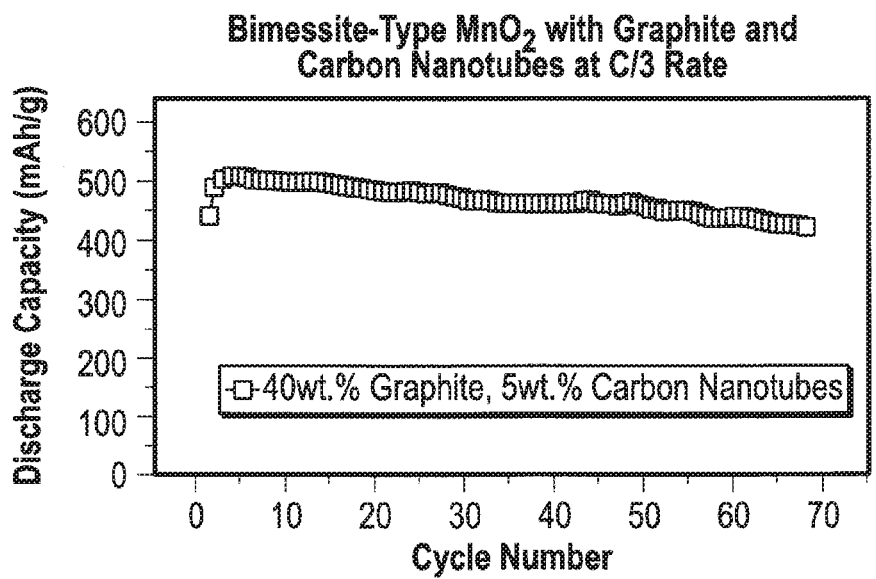
FIG. 9B shows galvanostatic cycling of 45 wt. % birnessite-type $MnO_2$ mixed with 40 wt. % graphite and 5 wt. % carbon nanotubes at C/3.

FIG. 9A, FIG. 9B, FIG. 9C and FIG. 9D show galvanostatic cycling data for the different electrodes and their respective loadings and rates. FIG. 9A shows the cycling of 45 wt. % loading of birnessite-type $MnO_2$ and 45 wt % carbon nanotubes (the first electrode), where initially a high capacity was obtained that steadily increased to about 20 cycles, after which, the complete second electron capacity was obtained. FIG. 9B shows the cycling results of a 45 wt. % loading birnessite-type $MnO_2$ mixed with 40 wt. % graphite and 5 wt. % carbon nanotubes at C/3 (the third electrode). A high capacity was also obtained, as seen in FIG. 9B, and after 70 cycles, the capacity was still around 450 mAh/g. FIG. 9A and FIG. 9B demonstrate the important role of carbon nanotubes in increasing the conductivity of the electrode and achieving maximum capacity during cycling.

Figure 9C:
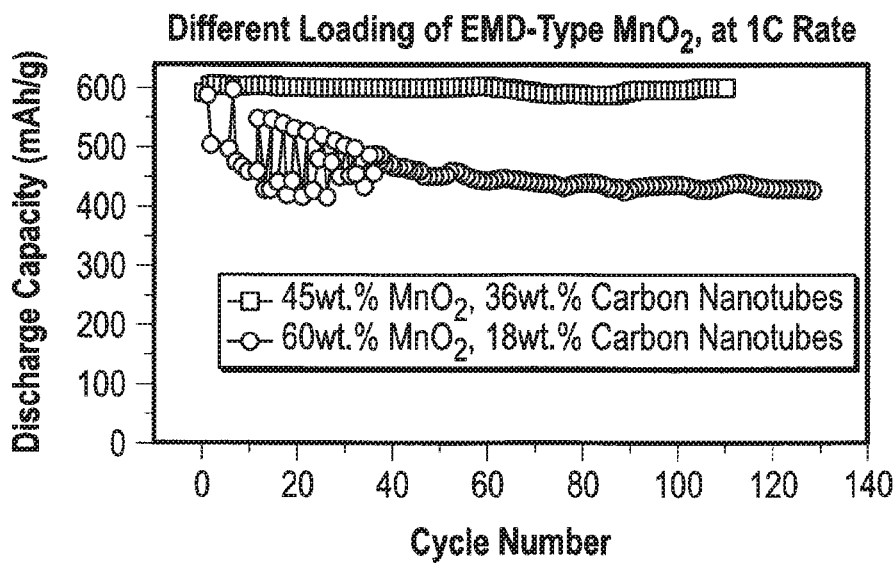
Figure 9D:
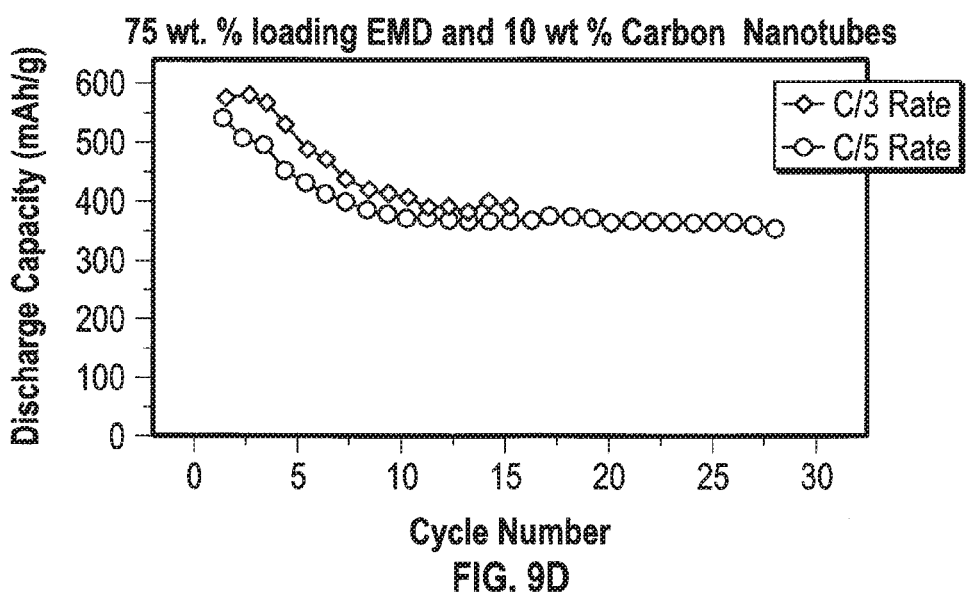
FIG. 9D illustrates galvanostatic cycling of 75 wt. % EMD-type $MnO_2$ mixed with 10 wt. % carbon nanotubes at different rates.

FIG. 9C shows the cycling results of higher loading EMD-type $MnO_2$ mixed with carbon nanotube electrodes at 1 C. The 45 wt. % EMD-type $MnO_2$ with 36 wt. % carbon nanotubes (the second electrode) achieves the complete capacity in the first cycle and remains consistent in subsequent cycles. The EMD-type $MnO_2$ transforms into birnessite-type $MnO_2$ during cycling. This behavior is very similar to the birnessite-type $MnO_2$ shown in FIG. 9A. The 60 wt. % EMD-type $MnO_2$ mixed with 18 wt. % carbon nanotubes (the fourth electrode) also exhibits a very high capacity of around 420 mAh/g after 120 cycles at very high rates of 1 C for charge and discharge. FIG. 9D shows the cycling results of 75 wt. % loading of EMD-type $MnO_2$ with 10 wt. % carbon nanotubes (the fifth electrode) at C/3 and C/5 rates. The cell running at C/3 has a capacity of around 350 mAh/g after around 30 cycles, and the cell running at C/5 has a capacity of around 400 mAh/g after sixteen cycles. The results shown in FIGS. 9A-9D indicate the importance of high conductive carbon sources in achieving high capacity for higher loadings of $MnO_2$ during cycling at rates of interest in the battery community.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of producing a battery, the method comprising:
    mixing manganese chloride, a bismuth salt, and an acid in a reactor to form a reaction mixture;
    adding an alkaline hydroxide to the reaction mixture;
    oxidizing the reaction mixture; and
    forming, based on the oxidizing, a manganese oxide compound comprising a birnessite phase manganese dioxide;
    producing a cathode, the cathode comprising a cathode material comprising:
        the manganese oxide compound;
        a bismuth compound selected from the group consisting of elemental bismuth and a bismuth salt; and
        copper,
    disposing the cathode into a housing;
    disposing an anode into the housing;
    disposing a polymeric separator between the anode and the cathode such that the anode and the cathode are separated; and
    adding an electrolyte to the housing.

2. The method of claim 1, wherein the bismuth salt comprises bismuth chloride.

3. The method of claim 1, further comprising:
    mixing a copper salt with the reaction mixture prior to oxidizing the reaction mixture.

4. The method of claim 1, wherein the birnessite phase manganese dioxide has a layered nanostructure, and wherein the birnessite phase manganese dioxide comprises the bismuth and the copper ion exchanged within the layered nanostructure.

5. A method of producing a cathode, the method comprising steps of:
    mixing multiple ingredients to form a cathode paste, the multiple ingredients comprising:
        a manganese oxide compound comprising electrolytic manganese dioxide (EMD), wherein the manganese oxide compound comprises a non-birnessite-phase of manganese dioxide;
        a bismuth compound selected from the group consisting of: elemental bismuth, a bismuth salt, and combinations thereof; and
        a copper compound comprising elemental copper,
    pressing the cathode paste onto a cathode current collector at a pressure between $6.9 \times 10^6$ and $1.4 \times 10^8$ Pascals to form a pressed assembly;
    drying the pressed assembly to produce a cathode;
    performing one or more conditioning cycles on the cathode, wherein each conditioning cycle of the one or more conditioning cycles comprises:
        discharging the cathode to an end of the manganese dioxide compound second electron stage;
        recharging at least a portion of the manganese oxide compound back to a $Mn^{4+}$ state; and
        converting at least a portion of the non-birnessite phase of manganese dioxide into birnessite phase manganese dioxide as a result of the discharging and recharging.

6. The method as recited in claim 5, wherein the multiple ingredients further comprises a conductive carbon.

7. The method as recited in claim 5, wherein the multiple ingredients further comprises a binder.

8. The method as recited in claim 5, further comprising:
    simultaneously pressing the cathode paste onto the cathode current collector and onto a substrate of elemental copper to form the pressed assembly.

9. The method of claim 5, wherein the elemental copper is in a powder form or a metallic support form, wherein the metallic support form comprises at least one of a mesh, a foil, an ingot, a sheet, or a wire.

10. The method of claim 5, wherein the cathode material further comprises a conductive carbon, and wherein the cathode material consists essentially of greater than 0 wt. % and less than or equal to 30 wt. % of the conductive carbon; between 1-20 wt. % of the bismuth compound; between 1-70 wt. % of the copper compound; greater than 0 wt. % and less than or equal to 10 wt. % of a binder; and the balance being the manganese oxide compound.

11. The method of claim 5, wherein the elemental copper is a solid copper support.

12. The method of claim 5, wherein the cathode material further comprises a cellulose-based hydrogel binder.

13. The method of claim 5, wherein the bismuth compound is bismuth oxide.

14. A method of producing a battery, the method comprising:
    forming a birnessite-phase manganese dioxide by mixing manganese chloride with bismuth chloride and nitric acid in a chilled 1-10 M solution of alkaline hydroxide, wherein the chilled 1-10 M solution is between 0-10 C for 0.5-24 hours;
    producing a cathode, the cathode comprising a cathode material comprising:
        a manganese oxide compound comprising the birnessite-phase manganese dioxide;

a bismuth compound selected from the group consisting of elemental bismuth and a bismuth salt; and
copper,
disposing the cathode into a housing;
disposing an anode into the housing;
disposing a polymeric separator between the anode and the cathode such that the anode and the cathode are separated; and
adding an electrolyte to the housing.

15. The method of claim 14, wherein the step of mixing manganese chloride further comprises mixing copper chloride.

16. The method of claim 14, wherein the step of mixing manganese chloride with the bismuth chloride, the copper chloride and the nitric acid occurs simultaneously.

* * * * *